(12) United States Patent
Koch et al.

(10) Patent No.: US 6,413,021 B1
(45) Date of Patent: Jul. 2, 2002

(54) ROTATING CUTTING TOOL

(75) Inventors: Wolfgang Koch, Reutte; Christian Ertl, Ehenbichl, both of (AT)

(73) Assignee: Plansee Tizit Aktiengesellschaft, Tirol (AT)

(*) Notice: Subject to any disclaimer, the term of this patent is extended or adjusted under 35 U.S.C. 154(b) by 91 days.

(21) Appl. No.: 09/655,383

(22) Filed: Sep. 5, 2000

(30) Foreign Application Priority Data

Sep. 9, 1999 (AT) .............................................. 612/99

(51) Int. Cl.⁷ .............................. B26D 1/12; B23C 5/20
(52) U.S. Cl. .............................. 407/43; 407/47; 407/51; 407/56
(58) Field of Search .............................. 407/35, 40, 43, 407/46, 47, 48, 50, 51, 53, 56, 120, 103, 113, 114, 115, 116

(56) References Cited

U.S. PATENT DOCUMENTS

| | | | | |
|---|---|---|---|---|
| 4,462,725 A | * | 7/1984 | Satran et al. ................ | 407/92 |
| 4,738,570 A | * | 4/1988 | Wertheimer ................ | 407/50 |
| 5,054,967 A | * | 10/1991 | Noguchi et al. ............. | 407/110 |
| 5,076,739 A | * | 12/1991 | Pano .......................... | 407/116 |
| 5,743,680 A | * | 4/1998 | Von Hass et al. ............ | 407/19 |

FOREIGN PATENT DOCUMENTS

EP          0469672 A3 * 6/1992

* cited by examiner

Primary Examiner—Henry Tsai
(74) Attorney, Agent, or Firm—Morgan & Finnegan, L.L.P.

(57) ABSTRACT

A cutting tool for high-speed machining has at least one cutting insert that is interchangeably mounted to a main body of the tool. At least parts of the supporting surface of the cutting insert and of the receiving surface of the main body of the tool, when viewed in cross section perpendicular to the axis of rotation, are of an approximately V-shaped configuration and are engaged with each other. The crown region and also at least one of the end regions of the V-shaped supporting surface and receiving surface are mutually relieved. A bearing surface on the main body of the tool, in order to radially support the cutting insert, is arranged in such a way that a mounted cutting insert is tilted such that the supporting surface of the main body and the receiving surface come into mutual contact at only two points.

7 Claims, 2 Drawing Sheets

ROTATING CUTTING TOOL

FIELD OF THE INVENTION

The invention relates to a rotating cutting tool, particularly to a rotating cutting tool adapted to high speed machining.

BACKGROUND OF THE INVENTION

The invention relates to a rotating cutting tool for high-speed machining, having at least one cutting insert interchangeably mounted to a main body of the tool or to a tool cassette, with at least parts of, respectively, the supporting surface of the cutting insert and of the receiving surface of the main body of the tool or tool cassette, when viewed in cross section perpendicular to the axis of rotation (R), being of an approximately V-shaped configuration and engaging with each other.

Rotating cutting tools for high-speed machining, such as high-speed milling cutters or high-speed drills, operate at very high rotational speeds of up to 80,000 rpm and more. These high rotational speeds cause a great amount of centrifugal force to occur at the tool, subjecting the tool parts to the utmost levels of stress. Due to this great amount of centrifugal force, it no longer is possible, as is customary for tools used in conventional cutting, to connect an interchangeable cutting insert having a flat supporting surface to a main body of the tool or to a tool cassette only in a non-positive way by means of a clamped mounting or by means of screws, since the permissible level of stress on the mounting means will be exceeded. Consequently, tools for high-speed machining require, in addition to a non-positive connection between an interchangeable cutting insert and the main body of the tool, the creation of an interlocking connection in order to absorb the greater part of the centrifugal force by means of said interlocking connection and to decrease the level of stress on the mounting means.

Known interlocking connections are, for example, groove and tongue connections in which the supporting surface of the cutting insert features a rectangular tongue which is engaged with a corresponding groove of the receiving surface of the main body of the tool.

However, this type of construction leads to very high levels of stress on the main body of the tool, above all, in the base region of the groove due to the notch effect.

DE OS 35 33 125 describes another embodiment of an interlocking connection between an indexable insert and the main body of a tool. According to this publication, the supporting surface of the indexable insert and the receiving surface of the main body of the tool feature toothed regions in engagement with each other, the teeth of which extend parallel to the axis of rotation and which feature a certain amount of flank angle.

The disadvantage of this type of embodiment lies in the fact that a multitude of bearing contacts causes the presence of an overdefinition, through which an unequivocal positioning of the indexable insert in the main body of the tool fails to be guaranteed. Moreover, this toothed region is very small in relation to the magnitude of the indexable insert, which may lead to the breaking of individual teeth.

In addition, rotating tools for high-speed machining also are known in which the main body of the tool features a flat V-shaped groove engaged by the supporting surface of an indexable insert configured with a corresponding raised V shape. In this connection, the supporting surface of the indexable insert, the receiving surface of the main body of the tool and the radial bearing surface of the indexable insert on the main body of the tool are coordinated with each other, with play, in such a way that when the indexable insert is correctly positioned, its supporting surface is supported in a precise, snug fit by the receiving surface of the main body of the tool.

A disadvantage of this type of embodiment is that high levels of centrifugal force and cutting force may cause an indexable insert to tilt laterally in an uncontrolled way, during operation of the tool.

OBJECT OF THE INVENTION

The purpose of the present invention is to provide a rotating cutting tool for high-speed machining for which the cutting inserts feature an interlocking connection to the main body of the tool, having positional stability even under operating conditions without the occurrence of mechanical overstress at the cutting inserts, mounting elements or at parts of the main body of the tool.

SUMMARY OF THE INVENTION

The invention pertains to a cutting tool for high-speed machining, having at least one cutting insert interchangeably mounted to a main body of the tool. At least parts of, respectively, the supporting surface of the cutting insert and of the receiving surface of the main body of the tool, when viewed in cross section perpendicular to the axis of rotation, are of an approximately V-shaped configuration and are engaged with each other. The crown region and also at least one of the end regions of the V-shaped supporting surface and receiving surface are mutually relieved. A bearing surface on the main body of the tool, in order to radially support the cutting insert, is arranged in such a way that a mounted cutting insert is tilted such that the supporting surface of the main body and the receiving surface come into mutual contact at only two points.

DETAILED DESCRIPTION OF THE INVENTION

Figure 1:
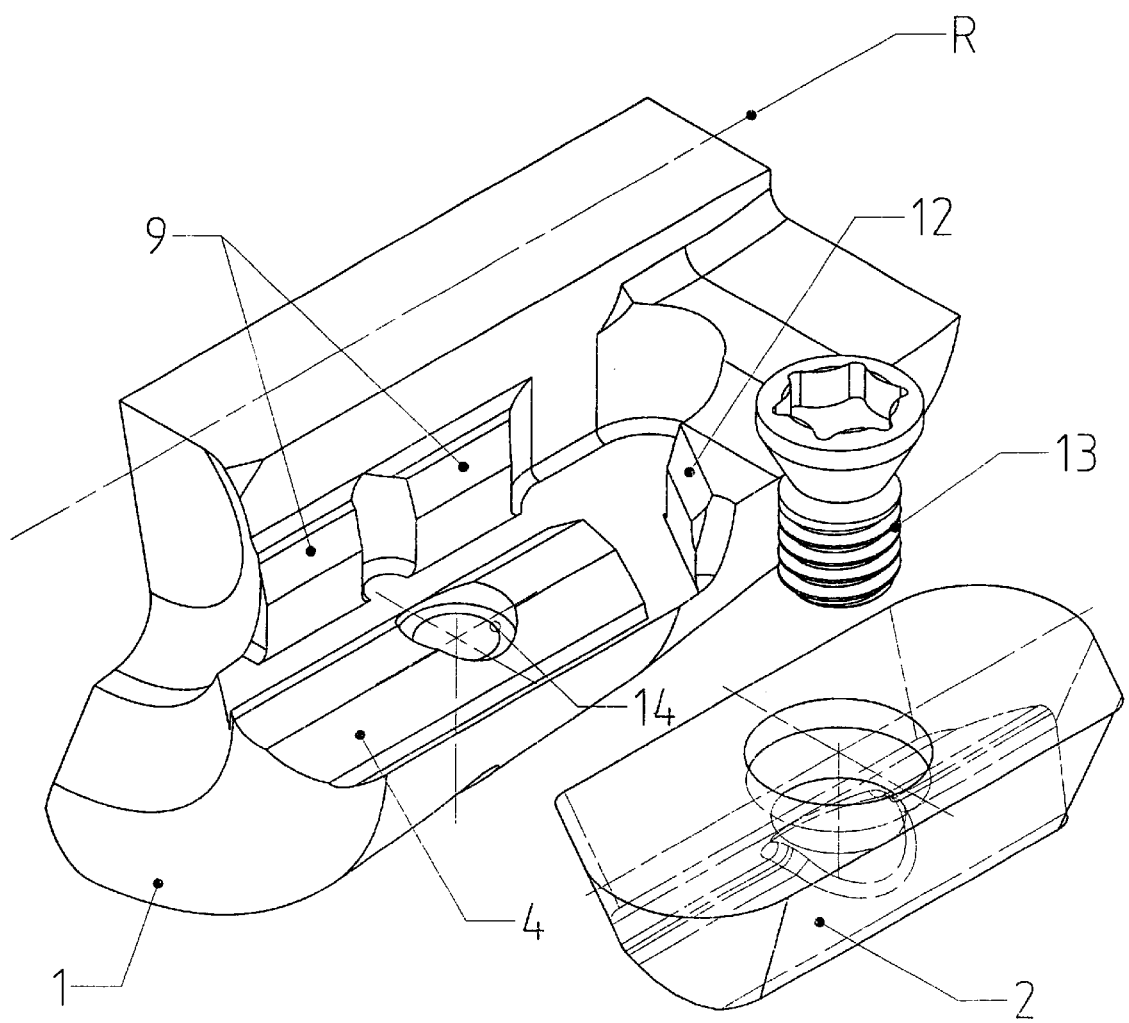
FIG. 1 is a representation of a fragment of a milling cutter according to the invention having an insert seat and cutting insert in exploded view.

According to the invention this is achieved by a crown region and also at least one end region of the V-shaped supporting surface and of the V-shaped receiving surface are mutually relieved, and that at least one bearing surface arranged essentially parallel to the axis of rotation (R) is arranged on the main body of the tool or on the tool cassette in order to radially support the cutting insert in such a way that the mounted cutting insert is tilted such that the supporting surface of the cutting insert and the receiving surface of the main body of the tool or of the tool cassette come into mutual contact at only two points. The points of contact are located on the legs of the V removed from the axis of rotation, one in a region near the crown and near the axis of rotation, and the other in a region farther from the crown and farther away from the axis of rotation.

In order to achieve said targeted tilting, the supporting surface, receiving surface, and radial bearing surface must be coordinated to each other in such a way that assuming a hypothetical precise, snug support of a cutting insert on the main body of a tool, the bearing surface for radial support of the cutting insert would be located within the cutting insert. When a cutting insert is mounted to the main body of a tool, this structural step and the mutual relief in the crown region and end region of the V-shaped supporting surface and receiving surface causes the radial bearing surface to tilt the cutting insert in relation to the main body of the tool so that the cutting insert arrives at the desired two point support. In this connection, a range between 0.1 mm and 0.5 mm, according to the size of the cutting insert, has been proven as a measure for the relief. This tilting effect wedges the cutting insert between the radial bearing surface and the V-shaped receiving surface of the main body of the tool such that during operation of the tool under regular operating conditions, additional uncontrolled tilting of the cutting insert largely is prevented.

In this connection, the radial bearing surface must be constructed such that the hypothetical measure by which the bearing surface would be located within the cutting insert, for a hypothetical precisely-fitting snug support of cutting insert and main body of the tool, would lie in the range of approximately 1–10%, advantageously 1.5–3%, of the encircled measure of the respective cutting insert used.

In a particularly advantageous embodiment of the invention, the V-shaped supporting surface of the cutting insert is configured as a groove and the V-shaped receiving surface of the main body of the tool or of the tool cassette is configured as a raised area. This causes any undesirable further tilting of the cutting insert in relation to the main body of the tool caused by centrifugal force occurring during cutting to be by-passed completely. Moreover, this structural measure causes the main body of the tool to feature an enlarged cross section at the location of greatest stress caused by cutting pressure.

In an additional advantageous configuration of the invention, the aperture angle of the V-shaped faces of the cutting insert and of the main body of the tool or of the tool cassette lie in a range between 90° and 150°.

This range of the aperture angle guarantees, on one hand, that the depth of the V-shaped groove in the cutting insert or in the main body of the tool or in the tool cassette will not become too great under consideration of the usual sizes for cutting inserts and, consequently, that the susceptibility to breakage of cutting inserts or of the main body of the tool will be decreased as much as possible and, on the other hand, that enough engagement will be provided to guarantee sufficient support of the cutting insert on the main body of the tool or on the tool cassette in relation to occurrent centrifugal force.

If the V-shaped supporting surface of a cutting insert is in the form of a groove, as a rule, the depth of the groove must not exceed $\frac{1}{3}$ of the overall thickness of the cutting insert in order to rule out the risk of fracture of a cutting insert during mounting.

In an exceptional case, particularly with a small cutting insert, the depth of the groove may reach up to half of the overall thickness of the cutting insert.

In an additional advantageous configuration of a cutting tool according to the invention, the crown region of the V-shaped faces is truncated by means of a straight line, with the mutual amount of relief ideally lying in the range of 0.1–0.5 mm.

In addition, it is an advantage for a cutting tool according to the invention, if the cutting insert features supporting chamfers laterally adjoining the V-shaped supporting surface. In an extreme case involving a blow-out of the cutting edge and the enormous rise of cutting pressure associated therewith, this causes the cutting insert to be able to tilt over only until the supporting chamfer arranged below the active cutting edge becomes supported against the receiving surface of the main body. Consequently, damage to the main body may largely be avoided, at least if the cutting insert is not completely destroyed.

A measure in the range between 0.1 and 0.5 mm, as a function of the size of the cutting insert, also has been proven to be practical for the amount of relief of the supporting chamfers.

It also has proven to be particularly advantageous if the cutting insert features a central hole and it is mounted to the main body of the tool or to the tool cassette by means of a clamping screw engaging the central hole. This achieves a simple and secure connection of the tool parts.

In the following, the invention is explained in greater detail with the aid of figures. A fragment of a milling cutter according to the invention for high-speed machining according to FIG. 1 shows an insert seat on the main body (1) of the tool and also the associated indexable insert (2). The receiving surface (4) for the cutting insert (2) is in the form of a raised V-shape, with a flat face truncating the crown region (6). Two bearing surfaces (9) are provided in order to radially support the indexable insert (2) essentially parallel to the axis of rotation (R) of the milling cutter. Axial positioning of the indexable insert (2) is carried out by means of a bearing surface (12) which supports the end of the indexable insert (2). A threaded hole (14) is provided in the center of the V-shaped receiving surface (4), which serves for mounting the indexable insert (2) to the main body (1) of the tool by means of a clamping screw (13).

The supporting surface (3) of the indexable insert (2) is configured as a V-shaped groove in a way coinciding with the V-shaped raised receiving surface (4) of the main body (1) of the tool. The crown region (5) of the V-shaped groove is truncated by means of a level face. The indexable insert (2) features support chamfers (7) arranged on both sides and adjoining the V-shaped supporting surface (3).

The radial bearing surfaces (9) of the insert seat are dimensioned in such a way that, for a precisely fitting support of the supporting surface (3) of the indexable insert (2) on the receiving surface (4) of the main body (1) of the tool, said bearing surfaces would be located within the indexable insert (2).

Figure 2:
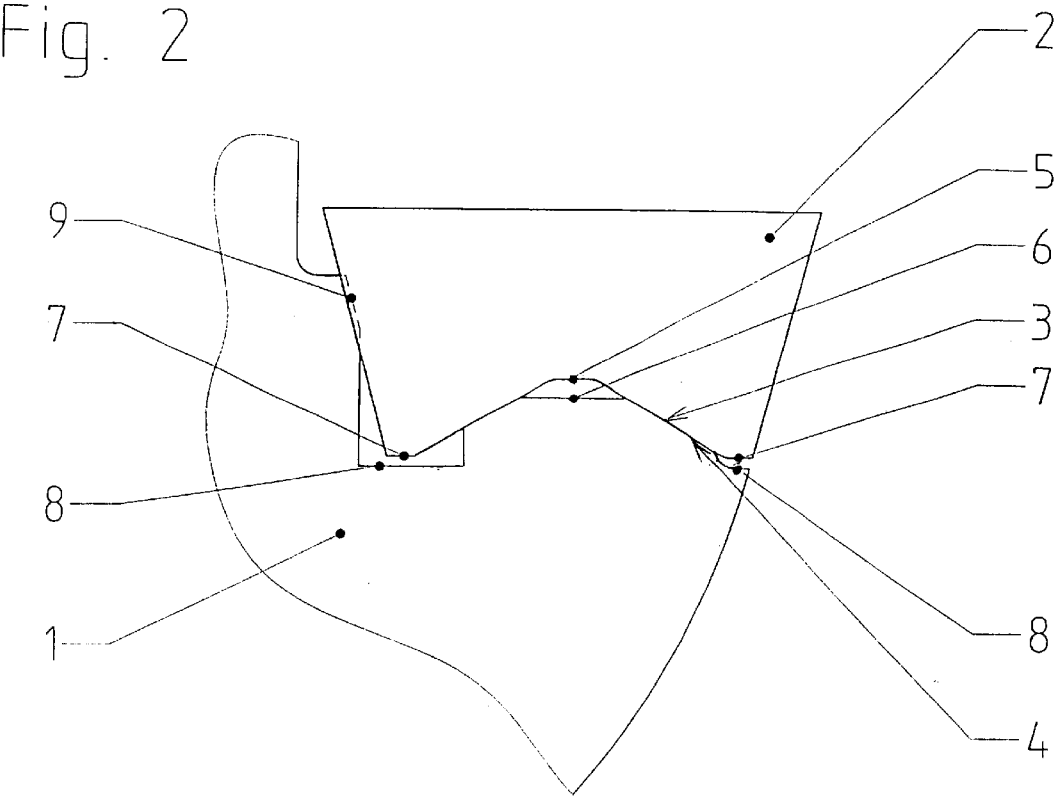
FIG. 2 is a representation of the principle of the relationships at the insert seat for a hypothetical precise, snug support of a cutting insert

This is represented by means of the figure of the principle according to FIG. 2.

Also represented in said figure are the relieved areas, required according to the invention, of the straight lines in the crown region (5) of the V-shaped supporting surface (3) opposite the straight lines in the crown region (6) of the V-shaped receiving surface (4) and also of the supporting chamfers (7) opposite the corresponding opposite surfaces (8) on the main body (1) of the tool.

In practice, when screwing down an indexable insert (2) to the main body (1) of the tool, the configuration according to the invention causes the radial bearing surfaces (9) to tilt the indexable insert (2) in such a way that the V-shaped supporting surface (3) of the indexable insert (2) and the V-shaped receiving surface (4) of the main body of the tool come into contact at only two points (10, 11).

One point (11) is located on the legs of the V arranged nearer to the axis of rotation (R) of the milling cutter, in the region near the crown, while the second point (10) is located on the legs of the V which are arranged further from the axis of rotation (R), in the region far from the crown.

Figure 3:
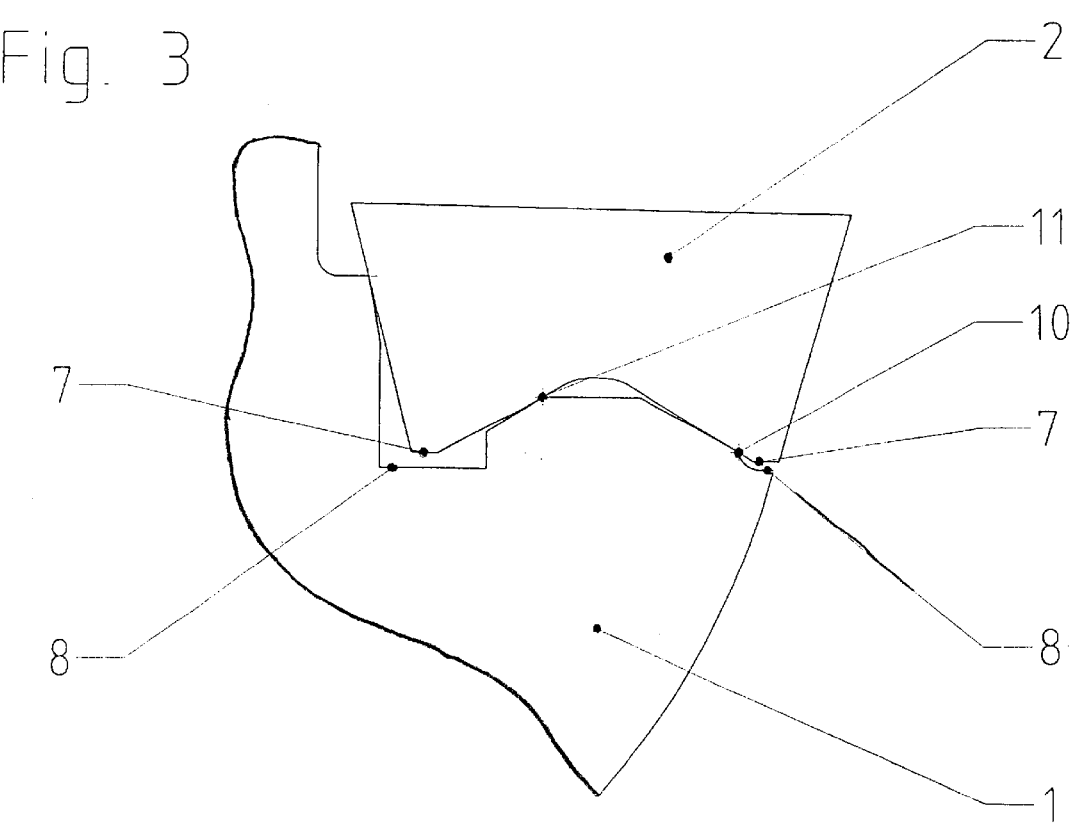
FIG. 3 is a representation of the principle of the relationships at the insert seat for the actual tilted support of a cutting insert.

These relationships occurring on the insert seat in practice are represented in FIG. 3.

What is claimed is:

1. A cutting tool for high-speed machining, comprising at least one cutting insert and a main body, wherein:

said cutting insert is adapted to be interchangeably mounted to said main body;

said cutting insert having a supporting surface and said main body having a receiving surface;

said cutting insert and said main body each having an at least partly V-shaped configuration when viewed in cross section perpendicular to an axis of rotation, for the engagement of said cutting insert with said main body;

said cutting insert and said main body each having a crown region and at least one end region configured so that said crown region and said end region are mutually relieved;

said main body further having a bearing surface to radially support said cutting insert in such a way that said cutting insert, when mounted, is tilted so that the receiving surface of said main body and the supporting surface of said cutting insert come into mutual contact at only two points; and said points of contact being disposed on each leg of said V-shaped configuration of said cutting insert and said main body, one point of contact being nearer said crown and is located on the legs of said V-shaped configuration nearer said axis of rotation and another point of contact being farther from said crown and is located on the legs of said V-shaped configuration farther from said axis of rotation.

2. The rotating cutting tool for high-speed machining of claim 1 wherein said V-shaped supporting surface of said cutting insert is configured as a groove and said V-shaped receiving surface of said main body is configured as a raised area.

3. The rotating cutting tool for high-speed machining of claim 1 wherein the aperture angles of said V-shaped faces of said cutting insert and of said main body are in a range between 90° and 150°.

4. The rotating cutting tool for high-speed machining of claim 1 wherein the crown region of said V-shaped faces is truncated by a straight line, with a mutual amount of relief in the range of 0.1–0.5 mm.

5. The rotating cutting tool for high-speed machining of claim 1 wherein said cutting insert has lateral support chamfers adjoining said V-shaped support surface.

6. The rotating cutting tool for high-speed machining of claim 1 wherein one of the at least one cutting insert has a central hole and is mounted to said main body by a clamping screw engaging said central hole.

7. The rotating cutting tool for high speed machining of claim 1, wherein said main body is a tool cartridge.

* * * * *